(12) United States Patent
Ghosh et al.

(10) Patent No.: US 11,050,677 B2
(45) Date of Patent: Jun. 29, 2021

(54) ENHANCED SELECTION OF CLOUD ARCHITECTURE PROFILES

(71) Applicant: Accenture Global Solutions Limited, Dublin (IE)

(72) Inventors: Bhaskar Ghosh, Bengaluru (IN); Kishore P. Durg, Bangalore (IN); Jothi Gouthaman, Chennai (IN); Radhika Golden, Trivandrum (IN); Mohan Sekhar, Bangalore (IN); Mahesh Venkataraman, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/880,591

(22) Filed: May 21, 2020

(65) Prior Publication Data
US 2021/0160191 A1 May 27, 2021

(30) Foreign Application Priority Data
Nov. 22, 2019 (IN) .............................. 201911047799

(51) Int. Cl.
*G06F 15/16* (2006.01)
*H04L 12/923* (2013.01)
*H04L 12/911* (2013.01)

(52) U.S. Cl.
CPC .......... *H04L 47/762* (2013.01); *H04L 47/745* (2013.01); *H04L 47/748* (2013.01); *H04L 47/788* (2013.01); *H04L 47/828* (2013.01)

(58) Field of Classification Search
CPC ... H04L 47/762; H04L 47/788; H04L 47/745; H04L 47/828; H04L 47/748
See application file for complete search history.

(56) References Cited

U.S. PATENT DOCUMENTS

| | | | |
|---|---|---|---|
| 8,612,599 B2 * | 12/2013 | Tung | H04L 41/5003 709/226 |
| 9,888,067 B1 * | 2/2018 | Yemini | G06F 9/5077 |

(Continued)

OTHER PUBLICATIONS

EP Extended Search Report in European Appln. No. 20208723.5, dated Apr. 20, 2021, 12 pages.

*Primary Examiner* — Hieu T Hoang
(74) *Attorney, Agent, or Firm* — Fish & Richardson P.C.

(57) ABSTRACT

This document describes modeling and simulation techniques to select a cloud architecture profile based on correlations between application workloads and resource utilization. In some aspects, a method includes obtaining infrastructure data specifying utilization of computing resources of an existing computing system. Application workload data specifying tasks performed by one or more applications running on the existing computing system is obtained. One or more models are generated based on the infrastructure data and the application workload data. The model(s) define an impact on utilization of each computing resource in response to changes in workloads of the application(s). A workload is simulated, using the model(s), on a candidate cloud architecture profile that specifies a set of computing resources. A simulated utilization of each computing resource of the candidate cloud architecture profile is determined based on the simulation. An updated cloud architecture profile is generated based on the simulated utilization.

18 Claims, 10 Drawing Sheets

(56) References Cited

U.S. PATENT DOCUMENTS

| | | | | |
|---|---|---|---|---|
| 10,346,775 B1* | 7/2019 | Xu | | G06Q 10/06315 |
| 10,552,586 B1* | 2/2020 | Duan | | H04L 47/78 |
| 10,671,509 B1* | 6/2020 | Thompson | | G06Q 10/06315 |
| 10,673,952 B1* | 6/2020 | Cohen | | H04L 67/32 |
| 11,019,138 B2* | 5/2021 | Dailianas | | G06F 9/505 |
| 2002/0166117 A1* | 11/2002 | Abrams | | G06Q 30/0283 |
| | | | | 717/177 |
| 2006/0059253 A1* | 3/2006 | Goodman | | G06Q 10/06 |
| | | | | 709/223 |
| 2006/0161884 A1 | 7/2006 | Lubrecht et al. | | |
| 2012/0198073 A1* | 8/2012 | Srikanth | | H04L 67/10 |
| | | | | 709/226 |
| 2013/0185433 A1* | 7/2013 | Zhu | | H04L 43/0882 |
| | | | | 709/226 |
| 2013/0185667 A1* | 7/2013 | Harper | | G06F 11/0751 |
| | | | | 715/772 |
| 2014/0068335 A1* | 3/2014 | Bromley | | H04L 43/50 |
| | | | | 714/32 |
| 2014/0089495 A1 | 3/2014 | Akolkar et al. | | |
| 2014/0303949 A1* | 10/2014 | Boneti | | G06F 30/20 |
| | | | | 703/6 |
| 2015/0066598 A1* | 3/2015 | Branch | | G06Q 10/06375 |
| | | | | 705/7.37 |
| 2015/0178129 A1* | 6/2015 | Dube | | G06F 9/4881 |
| | | | | 718/106 |
| 2016/0205202 A1* | 7/2016 | Jia | | G06Q 20/145 |
| | | | | 705/40 |
| 2016/0224392 A1* | 8/2016 | Clarke | | G06F 9/505 |
| 2017/0178027 A1* | 6/2017 | Duggan | | G06F 9/50 |
| 2017/0315902 A1* | 11/2017 | Moretto | | G06F 11/3692 |
| 2018/0077083 A1* | 3/2018 | Baughman | | H04L 47/823 |
| 2018/0081730 A1* | 3/2018 | Duttagupta | | G06F 11/3457 |
| 2018/0173567 A1* | 6/2018 | Olshefski | | G06F 9/50 |
| 2018/0302335 A1 | 10/2018 | Gao et al. | | |
| 2018/0349797 A1* | 12/2018 | Garvey | | G06F 9/46 |
| 2018/0357047 A1* | 12/2018 | Brown | | G06N 3/082 |
| 2019/0155651 A1* | 5/2019 | Di Cairano-Gilfedder | | G06F 9/5061 |
| 2020/0004591 A1* | 1/2020 | Das | | H04L 63/083 |
| 2020/0125973 A1* | 4/2020 | Townend | | G06N 20/00 |
| 2020/0310851 A1* | 10/2020 | Featonby | | G06F 9/5077 |

\* cited by examiner

BOM Architecture Sheet

| Cluster | Name | Azure Profile | CPU | Memory(GB) | Disk Profile | Disk Storage(GB) |
|---------|------|---------------|-----|------------|--------------|------------------|
| Web | SAP-WebDispat... | E8s_v3 | 8 | 64 | P4 | 32 |
| App | SAP-NetWeaver | E64s_v3 | 64 | 432 | P10 | 128 |
| App | SAP-NetWeaver | E64s_v3 | 64 | 432 | P10 | 128 |
| App | SAP-NetWeaver | E64s_v3 | 64 | 432 | P10 | 128 |
| App | SAP-NetWeaver | E64s_v3 | 64 | 432 | P10 | 128 |
| DB | SAP-Database | M128m... | 128 | 2048 | P40 | 2048 |

ENHANCED SELECTION OF CLOUD ARCHITECTURE PROFILES

CROSS-REFERENCE TO RELATED APPLICATION

This application claims the benefit of India Patent Application No. 201911047799, filed Nov. 22, 2019, which is hereby incorporated by reference in its entirety.

TECHNICAL FIELD

This specification relates to selecting cloud architecture profiles.

BACKGROUND

Enterprises migrate to cloud platforms for its numerous benefits like elasticity, scalability, on-demand, high availability, and pay-per-use. Cloud-based services enable business to quickly respond to growing or fluctuating resource demands, thereby enhancing business agility, reducing capital expenditures, increasing employee and stakeholder collaboration, and improving security and compliance.

Cloud platforms enhance organizations' ability to remain flexible to rapidly and constantly evolving demands, which also improves agility, reduces capital expenditure, increases employee and stakeholder collaboration, reinforces security and compliance, and boosts customer confidence.

SUMMARY

This specification relates to using workload modeling and simulation techniques to select a cloud architecture profile by simulating workloads on candidate cloud architecture profiles using models that are based on actual application workloads and correlations between the workloads and computing resource utilization.

In general, one innovative aspect of the subject matter described in this specification can be embodied in methods that include the actions of obtaining infrastructure data specifying utilization of computing resources of an existing computing system comprising multiple computers connected by a network. Application workload data specifying tasks performed by one or more applications running on the existing computing system is obtained. One or more models are generated based on the infrastructure data and the application workload data. The one or more models define an impact on utilization of each computing resource in response to changes in one or more workloads of the one or more applications. Data specifying an input simulation workload for the one or more applications is received. The input simulation workload is simulated, using the one or more models, on a candidate cloud architecture profile that specifies a set of computing resources and, for each computing resource, a quantity of the computing resource. A simulated utilization of each computing resource of the candidate cloud architecture profile for one or more time periods is determined based on the simulation. An updated cloud architecture profile is generated based on the simulated utilization of each computing resource of the candidate cloud architecture profile. The updated cloud architecture profile is provided. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some aspects, generating and providing the updated cloud architecture profile includes determining, based on the utilization of at least one computing resource and a scaling baseline for the at least one computing resource, to adjust the quantity of the computing resource in the updated cloud architecture profile.

In some aspects, generating the one or more models includes determining, based on the infrastructure data and the application workload data, patterns between the utilization of the computing resources and the tasks specified by the application workload data.

In some aspects, generating the one or more models includes classifying each task into a respective workload category of a set of specified workload categories and generating, based on the classifications, scalability rules for scaling the computing resources based on simulation of tasks of a given workload category.

In some aspects, the one or more models include a first user workload model that defines an first impact on the utilization of each computing resource in response to changes in a number of users of the one or more applications and a second user workload model that defines a second impact on the utilization of each computing resource in response to changes in a number of business tasks performed by the one or more applications.

Some aspects include generating an updated cloud architecture profile using an enhancement technique that predicts that one or more particular conditions will occur and scales one or more of the computing resources to reduce the occurrence of the one or more particular conditions. Some aspects include providing a user interface that enables a user to provide the input simulation workload and receiving, from the user interface, the input simulation workload.

The subject matter described in this specification can be implemented in particular embodiments and may result in one or more of the following advantages. Cloud architecture profiles can be generated based on correlations between actual workloads of existing computing infrastructure and the utilization of the computing resources of the existing computing infrastructure such that the cloud architecture profile is adapted to efficiently handle current and expected, e.g., planned, future workloads. Modeling and simulation techniques can be used to generate cloud architecture profiles that are better suited to efficiently process input workload sizes and characteristics. In this way, the cloud architecture profile is adapted to the planned workload, or easily scaled to handle the planned workload.

The modeling and simulation techniques can be also used to arrive at efficient resource utilization and to absorb spikes in utilization, and to determine when and where to perform vertical (e.g., using computing resources with greater processing power) and/or horizontal scaling (e.g., adding additional computing resources). Additional profile improvement and selection techniques can simulate sequences of events using the cloud architecture profile to evaluate the utilization of computing resources when handling the events and to identify various conditions that occur during the sequence of events, such that the cloud architecture can be further adapted to handle these events and/or prevent or mitigate the conditions. For example, simulating sequences of events can show that network communications between multiple servers can add latency to the entire system and the cloud architecture profile can be adjusted such that the functionality of the multiple servers are consolidated into a single server. By selecting cloud architecture profiles using models based on correlations between actual workloads and utilization of computing resources, the selected cloud architecture profile will be adapted to handle peak load conditions without being overloaded, without added latency due to being overloaded, and without errors, faults, system breakdowns, or resource failure caused by overloaded resources.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 9 is a user interface that presents a bill of material architecture sheet for a recommended cloud platform.

Like reference numbers and designations in the various drawings indicate like elements.

DETAILED DESCRIPTION

Figure 1:
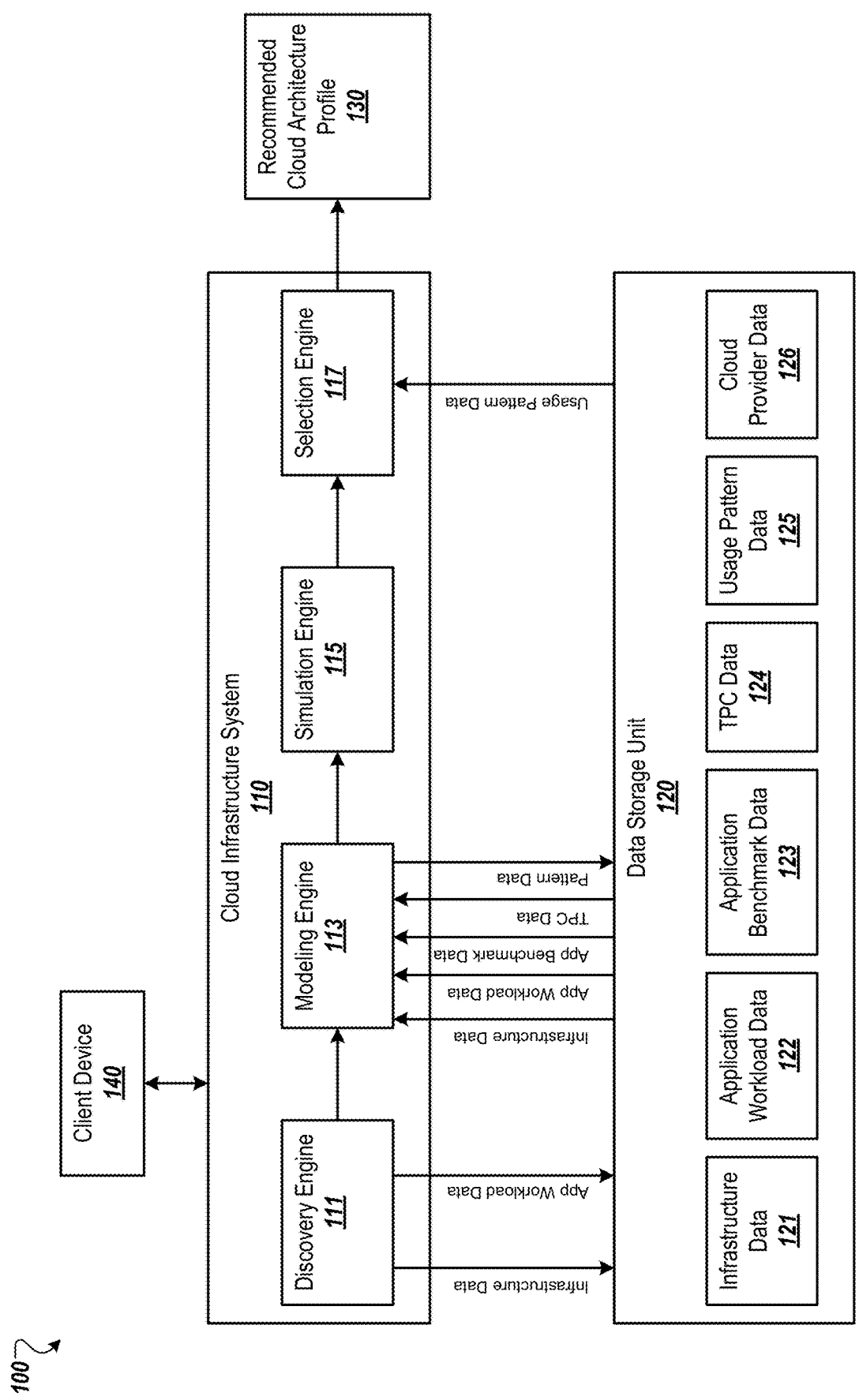
FIG. 1 is a block diagram of an example environment in which a cloud infrastructure system generates recommended cloud architecture profiles.

FIG. 1 is a block diagram of an example environment 100 in which a cloud infrastructure system 110 generates recommended cloud architecture profiles. The cloud infrastructure system 110 includes a discovery engine 111, a modeling engine 113, a simulation engine 115, and a selection engine 117. One or more users, e.g., solution architects and/or model trainers, can provide information to, and receive information from, the cloud infrastructure system 110 using a client device 140, as described in more detail below. The client device 140 can be directly connected to the cloud infrastructure system 110 or connected by way of a network, e.g., such as a local area network (LAN), a wide area network (WAN), the Internet, a mobile network, or a combination thereof. The cloud infrastructure system 110 can obtain and store data in a data storage unit 120, which can be implemented as one or more hard drives, flash memory, cloud storage, etc.

In general, the cloud infrastructure system 110 generates a recommended cloud architecture profile 130 based on an analysis of existing infrastructure, e.g., existing on-premise computing and networking resources, and workloads processed by the existing infrastructure. A recommended cloud architecture profile 130 can specify a cloud provider and/or the computing resources of a cloud platform, e.g., in the form of a bill of materials that specifies the computing resources. For example, if an organization is considering migrating on-premise computing equipment to a cloud platform, the cloud infrastructure system 110 can analyze the existing infrastructure and its workloads and generate one or more recommended cloud architecture profiles 130 for processing the workloads and future workloads.

This specification generally describes systems and techniques for using workload modeling and simulation to generate a cloud architecture based on application workloads and correlations between the workloads and computing resource utilization.

In general, cloud migration can include the discovery of existing infrastructure, e.g., on-premise computing resources, identification of assets to be migrated to the cloud, clustering and sequencing of migration, cloud infrastructure sizing and capacity planning, generation of a detailed plan, and execution of the plan. One aspect of cloud migration is determining how the system-to-be-migrated will leverage available scalability, burst rate, and cost efficiency features. In a lift and shift approach, absent the systems and techniques described in this document, an organization would typically replicate a sub-optimal infrastructure architecture in the cloud, which defeats the purpose of migrating. Migration should ensure that the cloud infrastructure is designed to support current and future business volumes in terms of both business transaction throughput and user base, minimize cloud infrastructure hardware resource cost, minimize system latency and response times, and fulfill peak transient demand.

The systems and techniques described in this document provide a solution to cloud migration that analyzes and correlates infrastructure utilization in conjunction with user load and business flow transaction volumes, optimizes or improves cloud architecture to support planned increases in user load or increases in business flows, and generates data specifying the cloud computing resources of a cloud platform, e.g., in the form of a recommended bill of materials. This system can optimize or improve cloud architecture to support planned increases in user load or increases in business flows by consolidating cloud resources to arrive at efficient resource utilization to absorb spikes in utilization and determining when and where to perform vertical and/or horizontal scaling.

The systems and techniques described in this document can ingest the following data: interim cloud infrastructure architecture from discovery tools, user workload historical data from on-premise applications, business transaction workload data from on-premise applications, and infrastructure resource utilization data from on-premise infrastructure. This system uses this data to create a model for predicting resource utilization given specific set of workloads and applies scalability rules to generate application-specific corrections. The system can simulate workloads on a candidate cloud architecture and optimize or improve the cloud architecture based on the simulations.

The discovery engine 111 collects infrastructure data 121 and application workload data 122 from the existing computing equipment and stores the data in the data storage unit 120. The infrastructure data 121 includes data specifying the computing resources, e.g., computers, memory, data storage devices, networking equipment, etc., and how the computing resources are connected. The computers can include, for example, web servers, application servers, database servers, client computers, and/or other appropriate types of computers.

The infrastructure data 121 can also include utilization and performance data for the computing resources. For example, the infrastructure data 121 can include data specifying the utilization of memory (e.g., percent used, numbers of pages in and out or memory, consumed memory, free memory, etc.), processors (e.g., utilization rates, such as processor utilization or system utilization, idle time or percentages, etc.), and data storage (e.g., percentage of space consumed or free, data transfer, throughput, etc.).

The application workload data 122 can include historical user workload data obtained from the existing applications and/or historical business transaction workload data obtained from the existing applications. The user workload data can specify, for each application, user tasks performed by the application and, for each user task, a time stamp that indicates when the task was performed. The business transaction workload data can specify, for each application, business transaction tasks performed by the application and, for each business task, a time stamp that indicates when the task was performed. The user tasks can include tasks initiated by a user, e.g., receiving a user input, saving a file, responding to requests, outputting data requested by the user, etc. The business transaction tasks can include tasks performed without direct user input, e.g., schedule recurring tasks, report generation, etc. The discovery engine 111 is described in more detail with reference to FIG. 2.

The modeling engine 113 creates a model for predicting resource utilization at various load characteristics, e.g., given a particular set of workloads. As described in more detail with reference to FIG. 3, the modeling engine 113 can use modeler rules to generate a model that provides an impact analysis on how CPU, memory, data storage and/or other appropriate computing parameters will change with a change in workload. The modeling engine 113 can also use a scalability analyzer to model the application performance with a change in workload, e.g., to determine when horizontal and/or vertical scaling should be performed. The modeling engine 113 is described in more detail with reference to FIG. 3.

The simulation engine 115 uses simulation techniques and the model created by the modeling engine 113 to simulate workloads and generates a cloud architecture for a cloud provider, e.g., a cloud provider selected by a user, e.g., a solution architect, using the client device 140. The simulation engine 115 can use the model(s) generated by the modeling engine 113 to simulate various workloads on one or more candidate cloud architecture profiles. For example, a user can create/adjust workloads for simulation using a user interface and the simulation engine 115 can simulate workloads on the candidate cloud architecture profile based on the specified/adjusted workload. If the simulation engine 115 determines that the baseline for the computing resources (e.g., CPU, memory, or data storage) of the candidate cloud architecture would be exceeded, the simulation engine 115 can recommend scaling, determine the appropriate scaling, and/or generate an updated cloud architecture profile. The simulation engine 115 is described in more detail with reference to FIG. 4.

The selection engine 117 obtains a cloud architecture profile, e.g., from the simulation engine 115 and improves or optimizes the cloud architecture profile based on application usage patterns, system utilization, etc., selects a recommended cloud architecture profile, and provides the recommended cloud architecture profile 130 that supports hardware scalability and elasticity, sustainability, and hardware consolidation. The selection engine 117 is described in more detail below with reference to FIG. 5.

Figure 2:
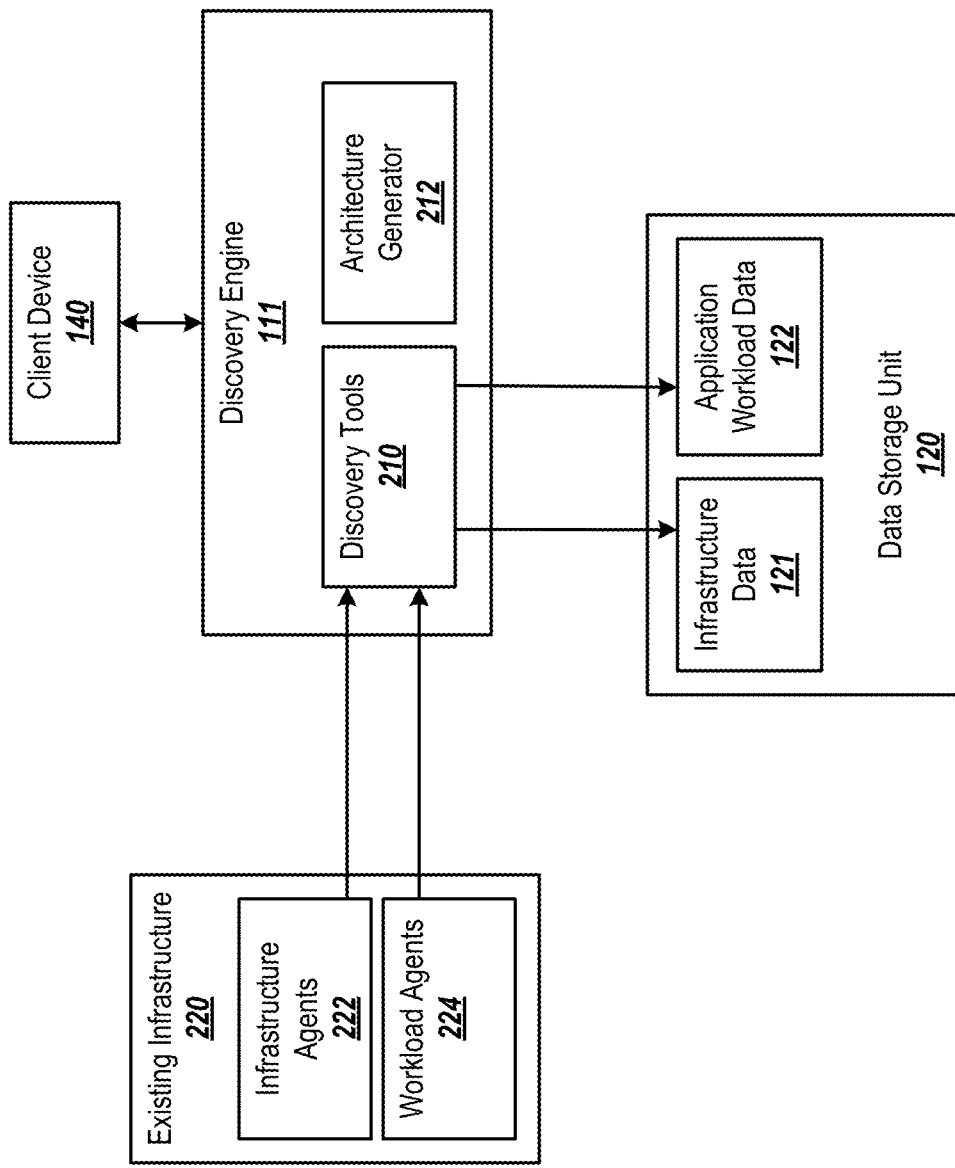
FIG. 2 is a block diagram illustrating the discovery engine of FIG. 1 in more detail.

FIG. 2 is a block diagram illustrating the discovery engine 111 of FIG. 1 in more detail. The discovery engine 111 includes discovery tools 210 and an architecture generator 212, which can each be implemented on one or more computers. The discovery tools 211 collects the infrastructure data 121 and the application workload data 122 from the existing infrastructure 220. In some implementations, infrastructure agents 222 and workload agents 224 are deployed in applications that are running on the existing infrastructure 220. The infrastructure agents 222 and workload agents 224 can include software modules installed in the applications and/or on the computers of the existing infrastructure.

The infrastructure agents 222 collect the infrastructure data 121 and provides the infrastructure data 121 to the discovery tools 210. The infrastructure agents 222 can be configured to identify the computing resources of the existing infrastructure 220. For example, the infrastructure agents 222 can include network scanners that are configured to scan a network for all of the computing devices connected to the network. If the existing infrastructure 220 includes multiple networks that are not connected, an infrastructure agent 22 can be deployed to each network. The infrastructure agents 222 can collect, for each identified computing resource, characteristics of the resource, e.g., type of resource, model information, performance specifications (e.g., processor speed, data capacity, memory capacity, bandwidth, etc.), and/or other appropriate characteristics. The infrastructure agents 222 can also collect information specifying how the computing resources are connected to each other on the network(s) of the existing infrastructure.

The infrastructure agents 222 can also monitor for and collect, as infrastructure data 121, the utilization and performance data for the computing resources. The infrastructure data 121 can include data specifying the utilization and/or performance of memory, e.g., percentage of memory used, numbers of pages that are transferred in and out of memory, the amount consumed memory at particular time, that amount of free memory, etc. The infrastructure data 121 can include data specifying the utilization and/o performance of processors, e.g., processor utilization or system utilization rates, idle time or percentage of time the processor is idle, the number of CPU cycles per minute, the number of tasks performed per minute, etc.). The infrastructure data 121 can include data specifying the utilization and/or performance of data storage devices, e.g., the percentage of storage space consumed or free, the amount of data transferred to and/or from storage, data throughput to and/or from data storage, etc.

The infrastructure agents 222 can monitor the appropriate utilization and performance data for the identified computing resources and provide the infrastructure data 121 for each computing resource to the discovery tools 210. For example, the infrastructure agents 222 can query system resources of computers to collect this information. The infrastructure agents 222 can connect to monitoring tools (e.g., installed on each computing resource) via application programming interface (API) calls to collect the infrastructure utilization data. In response to the API calls, the monitoring tools can provide, to the infrastructure agents 222, the queried utilization and/or performance data.

For each piece of utilization or performance data, the infrastructure agents 222 can also provide time stamp information that indicates the time at which the utilization or performance was measured or otherwise obtained. The discovery tools 210 receives the infrastructure data 121 from the infrastructure agents 222 and stores the infrastructure data 121 in the data storage unit 121.

The architecture generator 212 can generate an interim computing architecture for the existing infrastructure 220 based on the infrastructure data 121 collected by the infrastructure agents 122. The interim computing architecture can specify the computing resources identified by the infrastructure agents, their respective characteristics, and how the computing resources are connected on the network(s). For example, the interim infrastructure can include a bill of materials that includes information about each computing resource and/or a network architecture that illustrates or otherwise specifies how the computing resources are arranged on the network(s). The architecture generator 212 can store the interim computing architecture in the data storage unit 120.

The workload agents 224 can collect application workload data 122 from the applications of the existing infrastructure 220. As described above, the application workload data 122 can include historical user workload data obtained from the existing applications and/or historical business transaction workload data obtained from the existing applications. The user workload data can specify, for each application, user tasks performed by the application and, for each user task, a time stamp that indicates when the task was performed. The business transaction workload data can specify, for each application, business transaction tasks performed by the application and, for each business task, a time stamp that indicates when the task was performed.

The workload agents 224 can be installed as software modules in the applications or on the computers executing the applications. The workload agents 224 can monitor for user tasks and business tasks and, when detected, generate data specifying the task, the time stamp at which the task was performed, and/or a classification of the task as a user workload task or a business transaction task. In some implementations, the workload agents 224 can connect to an application through remote function calls and extract the usage data. In this example, the workload agents 224 can query (e.g., periodically based on a specified time period) the application for the application workload data 122 during the previous time period. The workload agents 224 can provide the data to the discovery tools 210 and the discovery tools 210 can store the data in the data storage unit 120.

The time stamps for the data enable the modeling engine 113 to correlate the data and identify patterns in the data, as described below. In some implementations, each agent 222 and 224 provides its time-series data, or time stamped data, to the discovery tools 210, e.g., continuously or periodically.

In some implementations, the infrastructure data 121 and/or the application workload data 122 can be collected and provided to the discovery tools 210 manually. For example, a user can export application workload data 122 from each application and/or a user can extract infrastructure data 121 from a monitoring tool of each computing resource.

Figure 3:
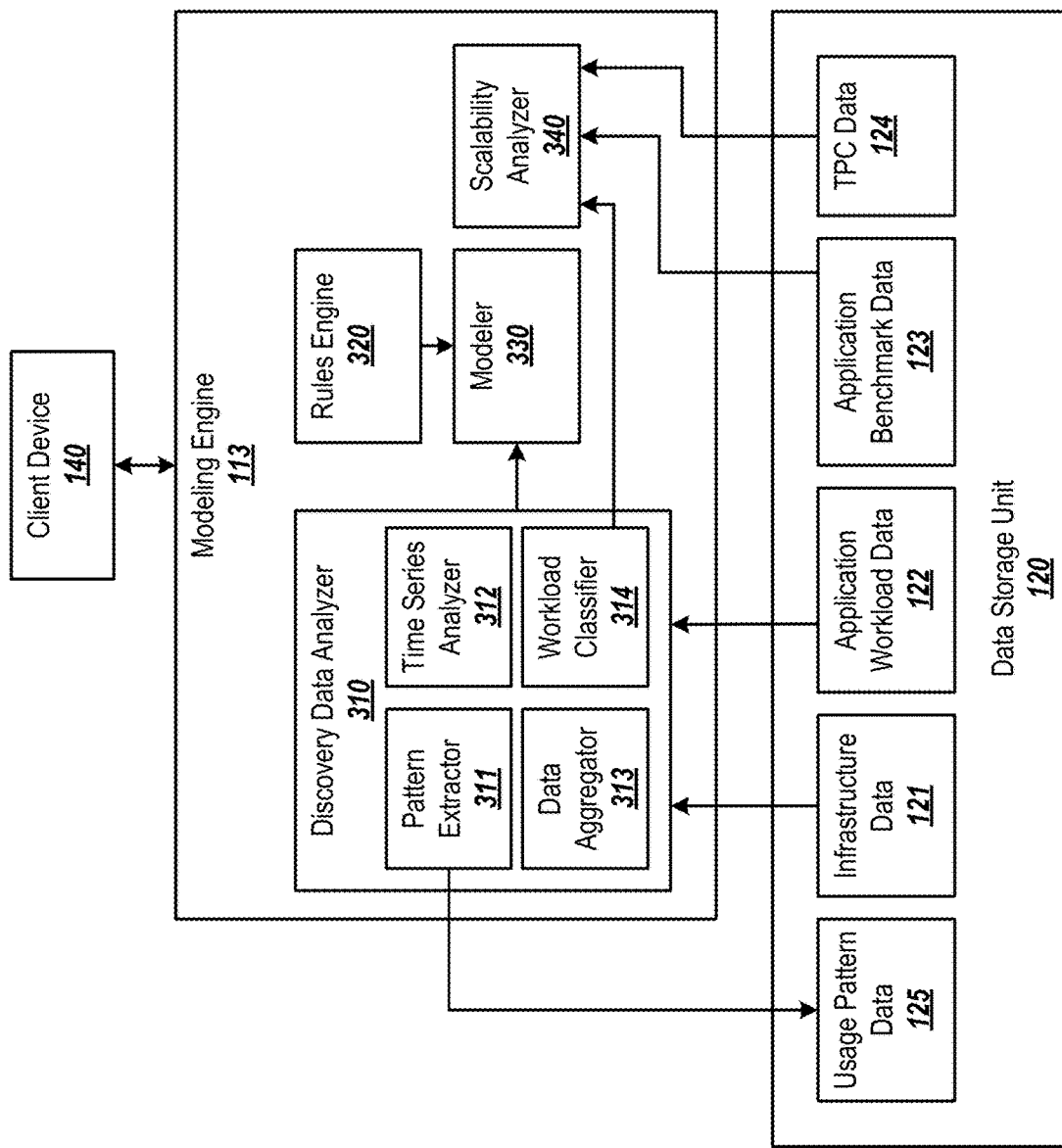
FIG. 3 is a block diagram illustrating the modeling engine of FIG. 1 in more detail.

FIG. 3 is a block diagram illustrating the modeling engine 113 of FIG. 1 in more detail. The modeling engine 113 includes a discovery data analyzer 310, a rules engine 320, a modeler 330, and a scalability analyzer 340. The discovery data analyzer 310 includes a pattern extractor 311, a time series analyzer 312, a data aggregator 313, and a workload classifier 314.

The pattern extractor 311 can analyze the infrastructure data 121 and the application workload data 122 to identify patterns between the two types of data. The pattern extractor 311 can use the time stamps of the infrastructure data 121 and the time stamps of the application workload data 122 to identify the patterns. The pattern analyzer 311 can identify patterns between (i) the utilization and/or the performance of particular computing resources and (ii) particular tasks, the number of tasks being performed, and/or the type of tasks being performed. For example, the pattern extractor 311 can identify, based on this analysis, that the CPU utilization has a particular range and that a particular percentage of memory is consumed when a particular type of user workload is processed. These types of patterns can be used to model the effect of each workload on computing resources. The pattern extractor 311 can store usage pattern data 125 that specifies the patterns in the data storage unit 120.

The data aggregator 313 performs aggregation on the infrastructure data 121 and the application workload data 122. Data aggregator 313 also performs look up(s) on related parameters to derive correlations for the modeler 330. As described above, the infrastructure data 121 and the application workload data 122 can include individual time stamped values. The data aggregator 313 can aggregate this data for particular time periods, e.g., for each 15 minute period, each 20 minute period, each hour, each day, etc. For example, the data aggregator 313 can aggregate the utilization data for one or more processors for each particular time period. In this example, the data aggregator 313 may determine the average processor utilization for a particular processor over each particular time period. Similarly, the data aggregator 313 can aggregate the number of user workload tasks and/or the number business transaction tasks per particular time period. For example, the data aggregator 313 can determine the total number of each type of task performed during each particular time period.

The data aggregator 313 can then correlate the aggregated infrastructure data with the aggregated application workload data. That is, the data aggregator 313 can correlate the aggregated utilization and/or performance of computing resources per particular time period with the corresponding aggregated user workload data and/or the business transaction data for each particular time period.

The time series analyzer 312 identifies various usage behavior and correlates the infrastructure behavior to arrive at trend patterns that are used for modeling and prediction. For example, the time series analyzer 312 can determine, for a particular time period, an average or range of the number of user tasks performed during the particular time period, an average or range of the number of business tasks performed during the particular time period, an average or range of the CPU utilization, memory utilization, and data storage utilization during the particular time period.

In some implementations, the time series analyzer 312 can identify, based on the outputs of the pattern extractor 311 and/or the data aggregator 313, correlations between the utilization and/or performance of computing resources with user tasks and/or business transaction tasks at peak or higher than normal workloads, e.g., for time periods for which the number of tasks exceeds an average number of tasks or time periods for which the number of tasks is higher than a particular percentage (e.g. 80%, 90%, etc.) of other time periods. This information shows the utilization and/or performance of the computing resources of the existing infrastructure 220 during peak workload periods.

The workload classifier 314 analyzes the business workloads and/or the user workloads of the application workload data 122 and classifies the workloads into categories. In some implementations, the workload classifier 314 classifies each workload into either a Type R (read) category, Type W (write) category, Type M (message processing) category, or Type I (generating reports, etc.) category. Other appropriate categories can be used depending on the implementation and the types of tasks performed by the applications of the existing infrastructure 220. The workload classifier 314 can classify each individual task into an appropriate category based on the nature of the task. For example, if a business workload was to generate a report, the business workload would be categorized as a Type I. If a business workload was to write data to data storage, the business workload would be categorized as Type W.

The rules engine 320 can include various types of rules, e.g., including modeler rules and scalability rules. The modeler rules define the various independent variables to be considered for predicting the dependent variables. For example, the modeler rules can define the maximum utilization or a maximum performance parameter for various computing resources and for various tasks. In particular, for a CPU, a modeler rule can specify, for each type of workload, a maximum processor queue length that should not be exceeded when the type of workload is being processed. For memory, a modeler rule can specify, for each type of workload, a maximum page in rate and a maximum page out rate that should not be exceeded when the type of workload is being processed. For data storage, a modeler rule can specify, for each type of workload, a maximum reads per second and a maximum writes per second that should not be exceeded when the type of workload is being processed. These rules can be used, for example, to determine when vertical and/or horizontal scaling should be performed based on simulated utilizations of the resources, as described below.

In some implementations, the independent variables of the modeler rules are as shown in Table 1:

TABLE 1

| if (CPU): | x1 = workload; x2 = processor queue length |
| if (memory): | x1 = workload; x2 = page in rate; x3 = page out rate |
| if (data storage): | x1 = workload; x2 = reads per second; x3 = writes per second |

In Table 1, x1, x2, xn are the independent variables. The workload (x1) can define the number of each type/category of task being performed. For example, a workload can be 100 user tasks and 75 type R business transaction tasks.

The scalability rules define the scaling parameters required for measuring the application scalability for each application of the existing infrastructure 220. The scalability rules can define the contention factor (a) and/or the coherency factor (b) for each category of workload. The contention factor represents contention between the different computing resources, e.g., the different computing resources of the existing infrastructure 220. The coherency factor represents the delay on the overall system caused by the system remaining in a coherent state.

The contention factor and the coherency factor of the scalability rules can be used to determine when to scale vertically and when to scale horizontally for the various categories of workloads. The contention factor and the coherency factor for each category of workload can be computed based on the application workload data 122 and the infrastructure data 121. For example, the scalability rules are specified in Table 2:

TABLE 2

| if (workload = Type R) | a = 0; b = 0 |
| if (workload = Type W) | a > 0; b > 0 |
| if (workload = Type M) | a > 0; b = 0 |
| if (workload = Type I) | a = 0; b > 0 |

In Table 2, "a" is the contention factor and "b" is the coherency factor. The modeler 330 generates a model based on the parameters defined in the rules engine 320. In some implementations, the modeler 330 generates a linear regression model using the parameters. For example, the modeler 330 can generate the following model:

$$Y = \beta 0 + \beta 1 \times 1 + \beta 2 \times 2 + \ldots + \beta n \times n + \beta \quad \text{Model 1:}$$

In this model, Y is the dependent variable, x is the dependent variable, and β is the regression coefficient. In one example, Y can be the CPU utilization and x can be the independent parameters for CPU, e.g., the workload (x1) and the maximum processor queue length (x2). The modeler 330 can generate a respective model for each computing resource of the existing infrastructure 220.

The modeler 330 can perform regression analysis on the utilization, performance and workload data generated by the discovery engine 111 to generate the models. For example, the modeler 330 can perform regression analysis based on the correlations between the utilization and/or performance data and the user and/or business transaction workload data. In one example, the data set can include 70% trained data and 30% modeled data. The regression output provides impact analysis on how much CPU/memory/data storage parameters change with a change in workload. The regression output can be a set of regression coefficients (β) that can be used to determine, e.g., predict, the utilization of performance of a computing resource based on the independent variables, e.g., including the workload which can be defined by the number and types/categories of tasks being performed. That is, the regression output can be the regression coefficients of Model 1 above.

In some implementations, the modeler 330 can generate one or more user workload models and/or business workload models. Each model provides an impact analysis on how much CPU/memory/data storage parameters change with a change in that type of workload. Similarly, the modeler 330 can generate one or more models for each category of workload, e.g., one for category R, one for category W, one for category M, and one for category I. Each model can have the same form as Model 1 above. For example, the modeler can perform regression analysis on each type and category of workload using the utilization, performance and workload data generated by the discovery engine 111.

In some implementations, a residual standard error is also computed to predict the accuracy of the model. For example, the residual standard error can be computed using the following equation:

$$RSE = \sum_{i=1}^{n} (yi - yi\hat{\,})2 \quad \text{Equation 1}$$

In Equation 1, RSE is the residual standard error and yi is the independent variable for which the error is being computed.

The scalability analyzer 340 uses Queueing theory and Universal Scalability laws to model the performance of an application with a change in workload. Various benchmark data 123 can be collected, e.g., a TPC Benchmark™ W (TPC-W) that measures web interactions processed per second. Any suitable benchmark data, including Transaction Processing Performance Council (TPC) benchmark data can be used. The benchmark data 123, which may include TPC benchmark data 124, can be stored in the data storage unit 120. The scalability analyzer 340 can use the benchmark data as an input for the model. The relative capacity of the system in terms of scalability can be measured by computing the contention factor (a) and the coherency factor (b).

$$C(N) = \frac{N}{1 + a(N-1) + bN(N-1)} \quad \text{Equation 2}$$

In Equation 2, N is the number of processors/users, C(N) is the scalability of the system, a is the contention factor, and b is the coherency factor. The relative capacity can be determined for each category of workload as the contention and coherency factors can be determined per category.

The scalability analyzer 340 can compute the contention factor and the coherency factor using regression analysis for various peak load scenarios which include different workload conditions. For example, the scalability analyzer 340 can perform regression analysis using the time-series data output by the time series analyzer 312. The capacity of the computing resources decreases with an increase in the contention/coherency, indicating that the knee point has been reached.

The scalability analyzer 340 can use the equation for the relative capacity to determine the relative capacity of each processor to process various types of workloads. The capacity varies based on the type of workload, which is handled by the contention and coherency factors as they are calculated per category of workload. The scalability analyzer 340 can compute the knee point, which is a saturation point, after which adding of any additional computing resources will not help in increasing the processing capacity. The scalability analyzer 304 can determine the knee point for a computing resource using the benchmark data 123. For example, the benchmark data 123 can include the throughput per second that a processor can process data. The scalability analyzer 304 can then determine the relative capacity of the system (e.g., the total quantity of that computing resource) using Equation 2 above, which is based on the Universal Scalability laws. The scalability analyzer 304 can calculate the knee point by analyzing the relative capacity of a computing resource with increases in the quantity of the computing resource. The knee point is the point at which the relative capacity does not increase with an increase in the quantity of the computing resource.

The scalability analyzer 340 can compare the capacity of the process to the knee point to determine whether scaling the processing power would increase the processing capacity. Based on this comparison, the scalability analyzer 340 can determine whether to add additional processors (horizontal scaling) or select processors having greater processing power (vertical scaling).

Figure 4:
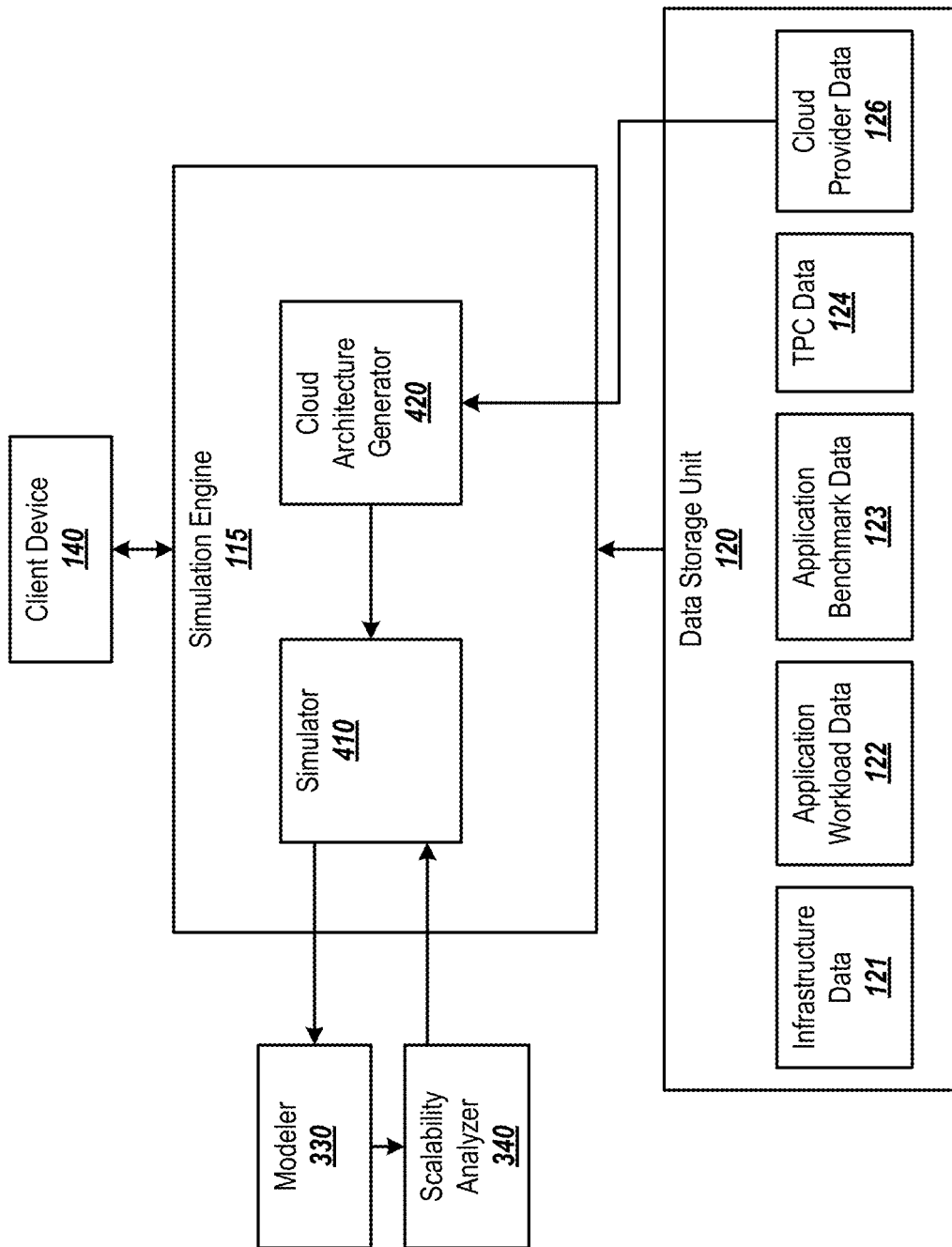
FIG. 4 is a block diagram illustrating the simulation engine of FIG. 1 in more detail.

FIG. 4 is a block diagram illustrating the simulation engine 115 of FIG. 1 in more detail. The simulation engine 115 includes a simulator 410 and a cloud architecture generator 420. The simulator 410 can perform simulations for a candidate cloud architecture profile using the model(s) generated by the modeling engine 113. The simulator 410 can simulate the utilization/performance of the computing resources of a candidate cloud architecture profile based on various user workloads and/or based on various business transaction workloads.

For example, the cloud architecture generator 420 can generate a candidate cloud architecture profile based on a number of users that may use the cloud architecture. The cloud architecture generator 420 can generate the candidate cloud architecture profile based on a cloud provider, e.g., selected by a user using the client device 140. The user can select the cloud provider and the number of users using the client device 140.

The simulator 410 can simulate the user workloads and/or the business transaction workloads that will be processed on the cloud architecture using the models generated by the modeling engine 113. For example, the simulator 410 can determine a number of user tasks and/or business transaction tasks that will be performed for each time period based on the number of users and the aggregated user workload and business transaction workload data generated by the data aggregator 313. It can be assumed that an increase in user load will increase the user tasks and business transaction tasks proportionally.

The simulator 410 can use the models generated by the modeling engine 113 to simulate the workloads on the candidate cloud architecture profile to compute the CPU utilization, memory utilization, and data storage usage for various user loads. For example, the simulator 410 can use the regression coefficients generated by the modeler 330 to determine the various utilizations of the computing resources for each user load. If the predicted values exceed their defined baselines, the simulator 410 can recommend scaling for one or more of the computing resources.

The simulator 410 can also run business transaction flow simulations in a similar manner. It can be assumed that the overall workload distribution will be as per the actual on-premise distribution. The transactions subjected to the simulation can be categorized into workload categories to measure the software scalability. The utilization of the CPU, memory, and data storage can be computed for the workload being simulated. If the predicted values exceed their baselines, a scaling can be recommended, similar to the user load simulation.

In some implementations, the simulator 410 uses the time-series data output by the time-series analyzer 312 to simulate the changes in workload per the various peak load time periods to determine the utilization of the computing resources during those time periods. This can show whether the simulated cloud architecture profile can handle the peak loads in addition to standard loads based on the number of users or number of business transactions. Thus, the simulator 410 can determine peak utilizations and average utilizations for particular user workloads and/or particular business transaction workloads.

The simulator 410 can use benchmark values defined by the application vendor and TPC-W as input for scaling along with the data generated by the discovery engine 111 to understand the application workload characterization. For transactions that fit into ideal concurrency buckets, vertical scaling can be recommended up to the number of available server profiles. For example, vertical scaling can be used until a saturation point for the hardware is reached. After the number of available server profiles are reached, horizontal scaling is recommended. For transactions that have an impact on contention and/or coherency, vertical scaling is recommended until the knee point computed as per the scalability laws. Horizontal scaling is recommended once the knee point is reached. Contention and coherency factors can be computed from the scalability models, as described above. Coefficients for the models can also be configured based on user experience for the application.

Based on the scaling determinations, the cloud architecture generator 420 can generate an updated cloud architecture profile that includes the scaled computing resources. The updated cloud architecture profile can include a bill of materials that specifies each computing resource of the cloud architecture profile and, for each computing resource, a quantity of the computing resource. The simulation of the user load and/or business transaction load can be then be ran on the updated cloud architecture profile. The user can adjust the user load and/or business transaction workload and the simulator 410 simulate the adjusted workload on the updated cloud architecture profile to determine the resource utilizations and, if appropriate recommend scaling to another updated cloud architecture profile.

The cloud architecture generator 420 can convert the infrastructure requirements computed by the modeling engine 113 to a cloud specific architecture of a specific cloud provider, e.g., selected by a user. The cloud architecture generator 420 can look up on various cloud provider data 126 using a human sort algorithm to identify the appropriate profiles for architecture generation.

Figure 5:
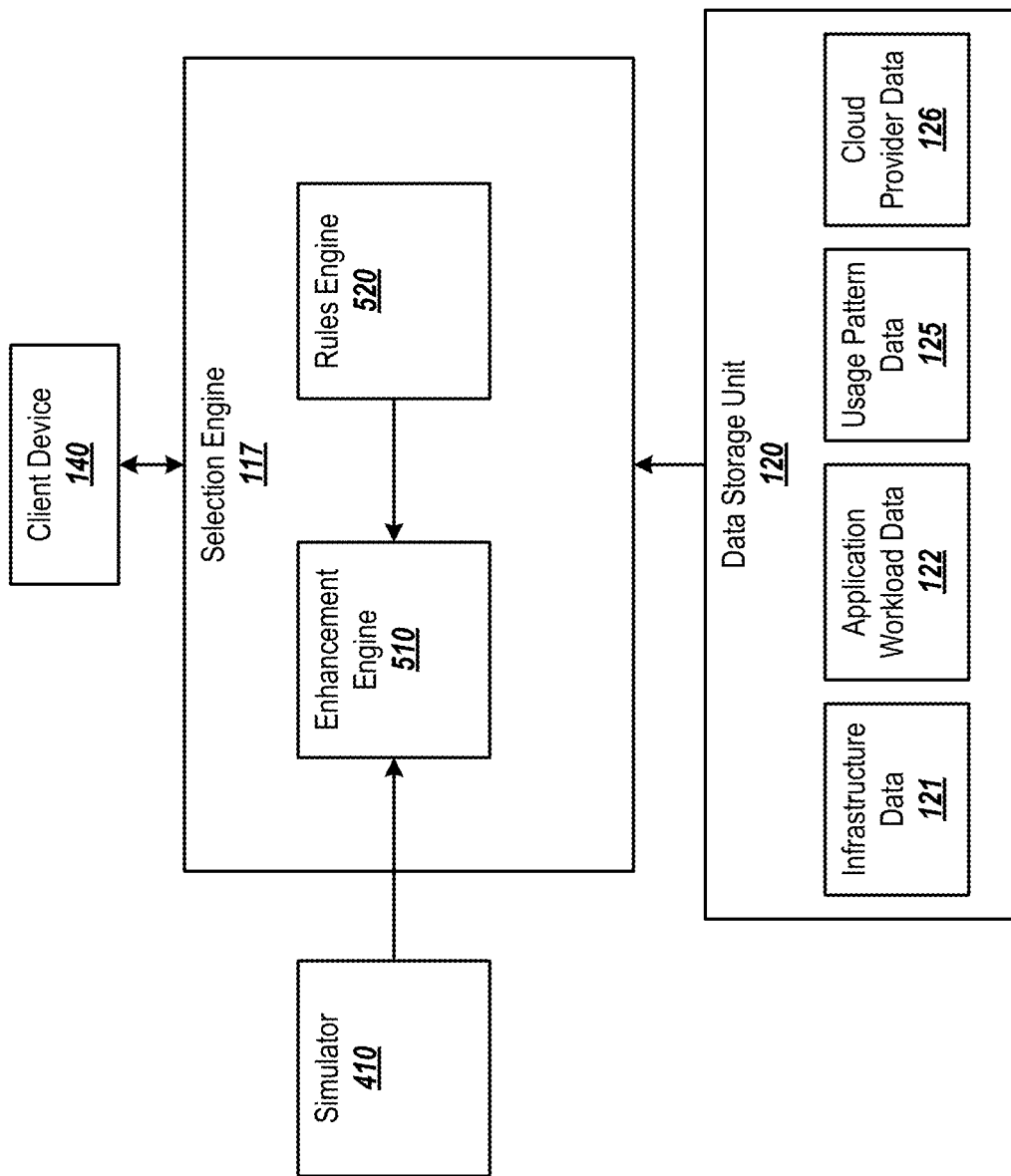
FIG. 5 is a block diagram illustrating the selection engine of FIG. 1 in more detail.

FIG. 5 is a block diagram illustrating the selection engine 117 of FIG. 1 in more detail. The selection engine 117 includes an enhancement engine 510 and a rules engine 520. The enhancement engine 510 takes the simulated cloud architecture profile and improves or optimizes it based on application usage patterns, system utilization, etc. and generates a recommended cloud architecture profile.

In some implementations, the enhancement engine 510 can evaluate the usage patterns identified by the discovery data analyzer 310 and the simulated resource utilization to predict the infrastructure requirements for peak workload requirements. One example prediction is the burst radius, which is a combination of lead time required for the cloud provider to bring up additional computing resources and peak usage prediction time. The enhancement engine 510 can optimize the cloud architecture profile such that the computing resources of the profile can be scaled in time to meet the peak usage when that peak usage is predicted to occur.

In some implementations, the enhancement engine 510 generates a Markov chain model to predict various system behaviors based on previous usage events. The Markov chain model can specify a sequence of user and/or business transaction events and include, for each event, a probability of the event occurring based on the state attained in the previous event. For example, the enhancement engine 510 can generate the Markov chain model based on the time-stamped user workload data and the business transaction workload data received from the workload agents 224. In another example, a user can generate the Markov chain model to specify a sequence of events, e.g., one or more particular processes performed by the applications of the existing infrastructure 222.

The enhancement engine 510 can use the Markov chain model to simulate the sequence(s) of events and predict the behavior of the cloud architecture profile when performing the events. The inputs to the model can include an input workload, e.g., as provided by a user and resource utilization trends, e.g., the models generated by the modeling engine 113. The enhancement engine 510 can use the models generated by the modeling engine 113 to predict the resource utilization and/or performance when performing the sequence of events. Based on this simulation, the enhancement engine 510 can determine the resource utilization for particular sequences of events, e.g., in view of other tasks also be being performed per the input workload.

For example, the enhancement engine 510 can predict communications between servers based on the workloads and their required communications. If two servers will communicate frequently, the enhancement engine 510 can consolidate the processes running on those servers onto a single cloud resource to reduce latency in the communications. In another example, the enhancement engine 510 can predict when memory transactions will be at capacity causing a processor to sit idle while waiting for data from memory. In this example, the enhancement engine 510 can determine to scale the memory, e.g., to provide additional memory for certain processes.

The rules engine 520 can include rules for optimization. The rules can be generated by a user of the existing infrastructure 222. For example, the rules can define various application scalability parameters, such as waiting to I/O, shared writable data exchange between cache, waiting for network I/O completion, waiting for bus transfer, waiting due to database table locks. If these conditions are predicted or simulated, the enhancement engine 510 can determine to scale certain components to reduce or prevent the occurrences of the conditions. For example, if a component is simulated to have to wait for a bus transfer from memory or data storage based on memory or data storage utilization, the enhancement engine 510 can recommend scaling the memory or data storage.

Figure 6:
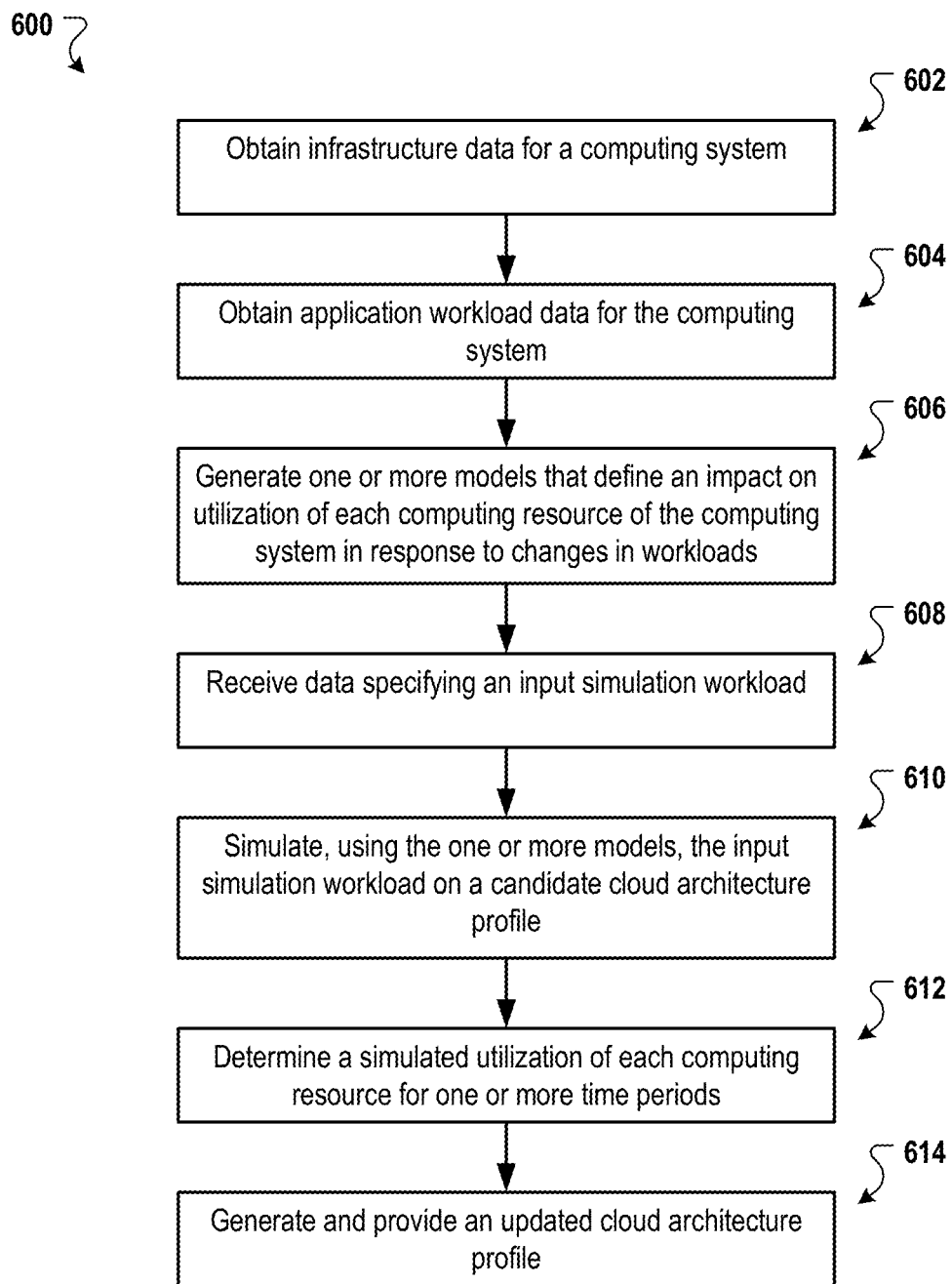
FIG. 6 is a flow chart of an example process for generating a cloud architecture profile based on workload data.

FIG. 6 is a flow chart of an example process 600 for generating a cloud architecture profile based on workload data. The process 600 can be implemented by the cloud infrastructure system 110 of FIG. 1. Operations of the process 600 can also be implemented as instructions stored on non-transitory computer readable media, and execution of the instructions by one or more data processing apparatus can cause the one or more data processing apparatus to perform the operations of the process 600.

The system receives infrastructure data for a computing system (602). The computing system can include an existing on-premise computing system, e.g., the existing infrastructure 220 of FIG. 2, that is being migrated to a cloud platform. The infrastructure data can include data specifying the computing resources, e.g., computers, memory, data storage devices, networking equipment, etc., and how the computing resources are connected. The infrastructure data 121 can also include utilization and performance data for the computing resources and a time stamp for each piece of utilization data and each piece of performance data.

The system receives application workload data (604). The application workload data can include historical user workload data obtained from existing applications of the computing system and/or historical business transaction workload data obtained from the existing applications. The user workload data can specify, for each application, user tasks performed by the application and, for each user task, a time stamp that indicates when the task was performed. The business transaction workload data can specify, for each application, business transaction tasks performed by the application and, for each business task, a time stamp that indicates when the task was performed.

The system generates one or more models that define an impact on utilization of each computing resource of the computing system in response to changes in the workload (606). The one or more models can include a model that defines the impact of changes in user workloads, e.g., the number of user tasks being performed by the computing system. The one or more models can include a model that defines the impact of changes in business transaction workloads, the number of business transaction tasks being performed by the computing system. These models can include a model for each category of workload. A described above, the models can be generated using regressions techniques.

The system receives data specifying an input simulation workload (608). For example, a user can specify a workload using a user interface, such as the user interface 700 of FIG. 7 or the user interface 800 of FIG. 8, described below. The input simulation workload can specify a user workload defining a number of users of the computing system and/or a category of business transaction workloads.

The system simulates, using the one or more models, the input simulation workload on a candidate cloud architecture profile (610). For example, the system can generate an initial candidate cloud architecture profile based on the exiting application workload data and the utilization of the computing resources of the computing system. The system can simulate the utilization of each computing resource of the candidate cloud architecture profile based on the defined impact on each computing resource and the quantity of the computing resource in the candidate cloud architecture profile.

The system determines, based on the simulation, the utilization of each computing resource for one or more time periods (612). As the workload can change over time, as determined by the data aggregator 313, the simulation can take into account these changes and predict the utilization at each time. The simulation can also predict the utilization of each computing resource at peak loads to determine which computing resources are over-utilized at peak loads.

The system generates and provides an updated cloud architecture profile (614). For example, the system can determine to adjust the quantity of one or more computing resources based on the simulated utilization and scaling parameters or scaling rules for the computing resources, as described above. The system can also use enhancement techniques to simulate sequences of events and further adapt or improve the updated cloud architecture profile based on the utilization of the computing resources predicted during this simulation.

The system can then provide the updated cloud architecture profile for presentation, e.g., in the form of a bill of materials in a user interface such at the user interface 900 of FIG. 9. A user can adjust the input simulated workload multiple times based on planned or potential changes in the workload of the system after migrating to the cloud to view the different cloud architecture profiles adapted for those workloads.

Figure 7:
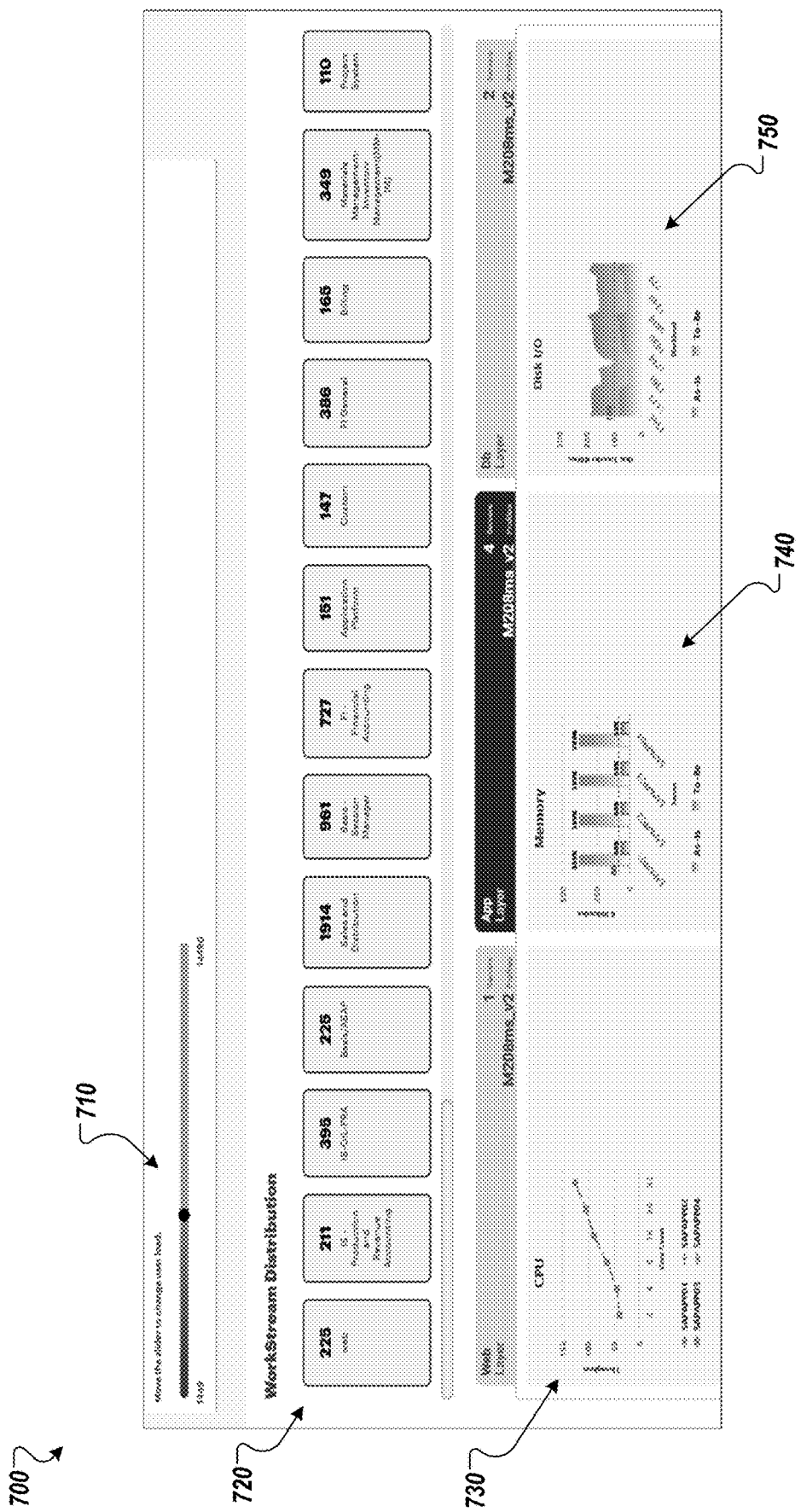
FIG. 7 is a user interface that enables a user to adjust user workload amounts and presents the effects of the adjusted user workload on the existing infrastructure and a simulated cloud platform.

FIG. 7 is an example user interface 700 that enables a user to adjust user workload amounts and presents the effects of the adjusted user workload on the existing infrastructure and/or a simulated cloud platform. The user interface 700 includes a user load control 710 that enables a user to adjust the user load, e.g., the expected number of users of the system.

In response to adjusting the user load, the cloud infrastructure system 110 can simulate the workloads using a cloud architecture profile and modules, as described above. The user interface 700 includes a workload distribution area that presents a workload distribution 720 output by the simulation, a CPU utilization area 730 that presents the utilization of the CPUs of the cloud architecture profile output by the simulation, a memory utilization area 740 that presents the utilization of the memory output by the simulation, and a data storage utilization area 750 that presents the utilization of the data storage output by the simulation. The user can adjust the user load using the user load control 710 and view the utilization of these computing resources for the various user loads.

Figure 8:
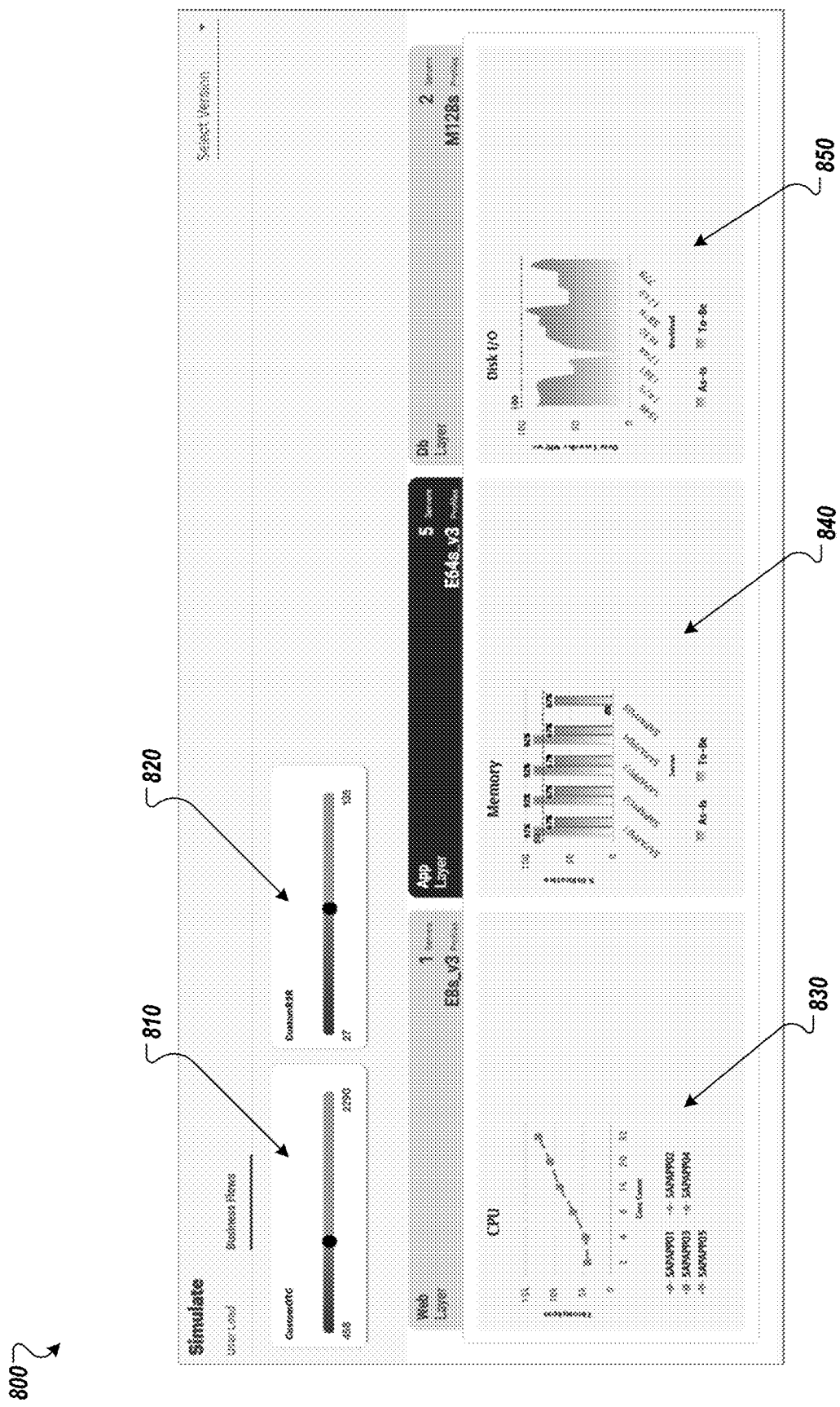
FIG. 8 is a user interface that enables a user to adjust business workload flows and presents the effects of the adjusted business workload flows on the existing infrastructure and a simulated cloud platform.

FIG. 8 is an example user interface 800 that enables a user to adjust business workload flows and presents the effects of the adjusted business workload flows on the existing infrastructure and a simulated cloud platform. The user interface 800 includes two user load controls 810 and 820 that enables a user to adjust two different (e.g., OTC or R2R) business workload flow loads.

In response to adjusting the either or both loads, the cloud infrastructure system 110 can simulate the workloads using a cloud architecture profile and models, as described above. The user interface 800 includes a CPU utilization area 830 that presents the utilization of the CPUs of the cloud architecture profile output by the simulation, a memory utilization area 840 that presents the utilization of the memory output by the simulation, and a data storage utilization area 850 that presents the utilization of the data storage output by the simulation. The user can adjust the business loads using the controls 810 and 820, and view the utilization of these computing resources for the various business loads.

FIG. 9 is an example user interface 900 that presents a bill of material architecture sheet for a recommended cloud platform. In this example, the bill of materials includes multiple clusters and, for each cluster, the number of CPUs, amount of memory, the disk profile, and the amount of disk storage for the cluster. The example user interface 900 can be output by the selection engine 117, e.g., after simulation and optimization.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 10:
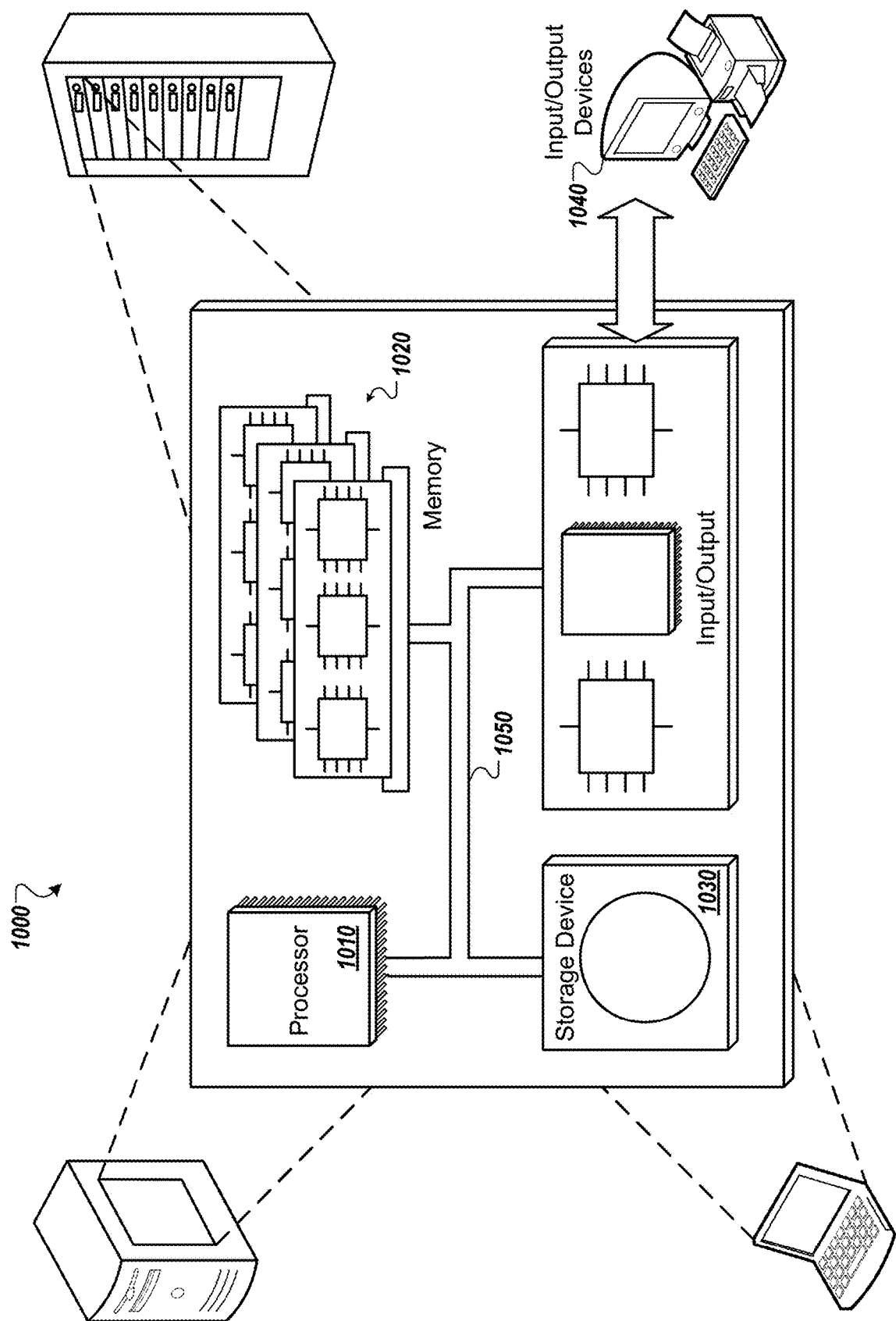
FIG. 10 is a block diagram of a computing system that can be used in connection with computer-implemented methods described in this document.

An example of one such type of computer is shown in FIG. 10, which shows a schematic diagram of a generic computer system 1000. The system 1000 can be used for the operations described in association with any of the computer-implemented methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   obtaining infrastructure data specifying utilization of computing resources of an existing computing system comprising multiple computers connected by a network;
   obtaining application workload data specifying tasks performed by one or more applications running on the existing computing system;
   generating, based on the infrastructure data and the application workload data, one or more models that define an impact on utilization of each computing resource in response to changes in one or more workloads of the one or more applications;
   receiving data specifying an input simulation workload defining a quantity of the tasks to be performed by the one or more applications;
   selecting a candidate cloud architecture profile based at least in part on a user-selected cloud provider, wherein the candidate cloud architecture profile specifies a set of cloud computing resources of the cloud provider and, for each computing resource, a quantity of the computing resource;
   simulating, using the one or more models, performing the tasks of the input simulation workload on the candidate cloud architecture profile;
   determining, based on the simulation, a simulated utilization of each computing resource of the candidate cloud architecture profile for one or more time periods; and
   generating and providing an updated cloud architecture profile based on the simulated utilization of each computing resource of the candidate cloud architecture profile, wherein the updated cloud architecture profile specifies an updated set of cloud computing resources of the cloud provider.

2. The method of claim 1, wherein generating and providing the updated cloud architecture profile comprises determining, based on the utilization of one or more computing resources and a respective scaling baseline for each of the one or more computing resources, to adjust the quantity of the one or more computing resources in the updated cloud architecture profile.

3. The method of claim 2, wherein determining, based on the utilization of one or more computing resources and the respective scaling baseline for each of the one or more computing resources, to adjust the quantity of the one or more computing resources in the updated cloud architecture profile comprises:
   determining, for a particular computing resource of the one or more computing resources, a contention factor and a cohesion factor; and
   determining, based on the contention factor, the cohesion factor, and the utilization of the particular computing resource, to scale the particular computing resource horizontally by increasing the quantity of the particular computing resource in the updated cloud architecture profile.

4. The method of claim 3, wherein determining to scale the particular computing resource horizontally by increasing the quantity of the particular computing resource comprises:
   scaling the particular computing resource horizontally by increasing performance of the particular computing resource;
   determining that a saturation point for scaling the particular computing resource horizontally has been reached; and
   scaling the particular computing resource vertically in response to determining that the saturation point has been reached.

5. The method of claim 2, wherein the respective scaling baseline for a particular computing resource comprises a maximum utilization of the particular computing resource.

6. The method of claim 2, wherein determining, based on the utilization of one or more computing resources and the respective scaling baseline for each of the one or more computing resources, to adjust the quantity of the one or more computing resources in the updated cloud architecture profile comprises:

determining to adjust the quantity of a particular computing resource of the one or more computing resources based on a modeler rule for the particular computing resource, wherein the modeler rule defines scaling of the particular computing resource based on a respective quantity of two or more different types of tasks of the workload data.

7. A system, comprising:

one or more computers; and one or more computer memory devices interoperably coupled with the one or more computers and having tangible, non-transitory, machine-readable media storing one or more instructions that, when executed by the one or more computers, perform operations comprising:

obtaining infrastructure data specifying utilization of computing resources of an existing computing system comprising multiple computers connected by a network;

obtaining application workload data specifying tasks performed by one or more applications running on the existing computing system;

generating, based on the infrastructure data and the application workload data, one or more models that define an impact on utilization of each computing resource in response to changes in one or more workloads of the one or more applications;

receiving data specifying an input simulation workload defining a quantity of the tasks to be performed by the one or more applications;

selecting a candidate cloud architecture profile based at least in part on a user-selected cloud provider, wherein the candidate cloud architecture profile specifies a set of cloud computing resources of the cloud provider and, for each computing resource, a quantity of the computing resource;

simulating, using the one or more models, performing the tasks of the input simulation workload on the candidate cloud architecture profile;

determining, based on the simulation, a simulated utilization of each computing resource of the candidate cloud architecture profile for one or more time periods; and generating and providing an updated cloud architecture profile based on the simulated utilization of each computing resource of the candidate cloud architecture profile, wherein the updated cloud architecture profile specifies an updated set of cloud computing resources of the cloud provider.

8. The system of claim 7, wherein generating and providing the updated cloud architecture profile comprises determining, based on the utilization of one or more computing resources and a respective scaling baseline for each of the one or more computing resources, to adjust the quantity of the one or more computing resources in the updated cloud architecture profile.

9. The system of claim 8, wherein determining, based on the utilization of one or more computing resources and the respective scaling baseline for each of the one or more computing resources, to adjust the quantity of the one or more computing resources in the updated cloud architecture profile comprises:

determining, for a particular computing resource of the one or more computing resources, a contention factor and a cohesion factor; and determining, based on the contention factor, the cohesion factor, and the utilization of the particular computing resource, to scale the particular computing resource horizontally by increasing the quantity of the particular computing resource in the updated cloud architecture profile.

10. The system of claim 9, wherein determining to scale the particular computing resource horizontally by increasing the quantity of the particular computing resource comprises:

scaling the particular computing resource horizontally by increasing performance of the particular computing resource;

determining that a saturation point for scaling the particular computing resource horizontally has been reached; and scaling the particular computing resource vertically in response to determining that the saturation point has been reached.

11. The system of claim 8, wherein the respective scaling baseline for a particular computing resource comprises a maximum utilization of the particular computing resource.

12. The system of claim 8, wherein determining, based on the utilization of one or more computing resources and the respective scaling baseline for each of the one or more computing resources, to adjust the quantity of the one or more computing resources in the updated cloud architecture profile comprises:

determining to adjust the quantity of a particular computing resource of the one or more computing resources based on a modeler rule for the particular computing resource, wherein the modeler rule defines scaling of the particular computing resource based on a respective quantity of two or more different types of tasks of the workload data.

13. A non-transitory, computer-readable medium storing one or more instructions executable by a computer system to perform operations comprising:

obtaining infrastructure data specifying utilization of computing resources of an existing computing system comprising multiple computers connected by a network;

obtaining application workload data specifying tasks performed by one or more applications running on the existing computing system;

generating, based on the infrastructure data and the application workload data, one or more models that define an impact on utilization of each computing resource in response to changes in one or more workloads of the one or more applications;

receiving data specifying an input simulation workload defining a quantity of the tasks to be performed by the one or more applications;

selecting a candidate cloud architecture profile based at least in part on a user-selected cloud provider, wherein the candidate cloud architecture profile specifies a set of cloud computing resources of the cloud provider and, for each computing resource, a quantity of the computing resource;

simulating, using the one or more models, performing the tasks of the input simulation workload on the candidate cloud architecture profile;

determining, based on the simulation, a simulated utilization of each computing resource of the candidate cloud architecture profile for one or more time periods; and generating and providing an updated cloud architecture profile based on the simulated utilization of each computing resource of the candidate cloud architecture profile, wherein the updated cloud architecture profile specifies an updated set of cloud computing resources of the cloud provider.

14. The non-transitory, computer-readable medium of claim 13, wherein generating and providing the updated cloud architecture profile comprises determining, based on the utilization of one or more computing resources and a respective scaling baseline for each of the one or more computing resources, to adjust the quantity of the one or more computing resources in the updated cloud architecture profile.

15. The non-transitory, computer-readable medium of claim 14, wherein determining, based on the utilization of one or more computing resources and the respective scaling baseline for each of the one or more computing resources, to adjust the quantity of the one or more computing resources in the updated cloud architecture profile comprises:

determining, for a particular computing resource of the one or more computing resources, a contention factor and a cohesion factor; and determining, based on the contention factor, the cohesion factor, and the utilization of the particular computing resource, to scale the particular computing resource horizontally by increasing the quantity of the particular computing resource in the updated cloud architecture profile.

16. The non-transitory, computer-readable medium of claim 15, wherein determining to scale the particular computing resource horizontally by increasing the quantity of the particular computing resource comprises:

scaling the particular computing resource horizontally by increasing performance of the particular computing resource;

determining that a saturation point for scaling the particular computing resource horizontally has been reached; and scaling the particular computing resource vertically in response to determining that the saturation point has been reached.

17. The non-transitory, computer-readable medium of claim 14, wherein the respective scaling baseline for a particular computing resource comprises a maximum utilization of the particular computing resource.

18. The non-transitory, computer-readable medium of claim 14, wherein determining, based on the utilization of one or more computing resources and the respective scaling baseline for each of the one or more computing resources, to adjust the quantity of the one or more computing resources in the updated cloud architecture profile comprises:

determining to adjust the quantity of a particular computing resource of the one or more computing resources based on a modeler rule for the particular computing resource, wherein the modeler rule defines scaling of the particular computing resource based on a respective quantity of two or more different types of tasks of the workload data.

* * * * *